(12) United States Patent
Koga et al.

(10) Patent No.: US 11,577,204 B2
(45) Date of Patent: Feb. 14, 2023

(54) WATER TREATMENT MEMBRANE WASHING APPARATUS AND WATER TREATMENT MEMBRANE WASHING METHOD

(71) Applicant: Mitsubishi Electric Corporation, Tokyo (JP)

(72) Inventors: Hiromichi Koga, Tokyo (JP); Koichi Tokimori, Tokyo (JP); Nozomu Yasunaga, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 459 days.

(21) Appl. No.: 16/634,731

(22) PCT Filed: Jul. 20, 2018

(86) PCT No.: PCT/JP2018/027217
§ 371 (c)(1),
(2) Date: Jan. 28, 2020

(87) PCT Pub. No.: WO2019/039155
PCT Pub. Date: Feb. 28, 2019

(65) Prior Publication Data
US 2020/0197872 A1 Jun. 25, 2020

(30) Foreign Application Priority Data

Aug. 23, 2017 (WO) ................ PCT/JP2017/030084

(51) Int. Cl.
*B01D 65/02* (2006.01)
*C02F 1/44* (2006.01)

(52) U.S. Cl.
CPC ............ *B01D 65/02* (2013.01); *C02F 1/44* (2013.01); *B01D 2321/04* (2013.01);
(Continued)

(58) Field of Classification Search
CPC ............ B01D 2321/04; B01D 2321/12; B01D 2321/18; C02F 1/78
See application file for complete search history.

(56) References Cited

U.S. PATENT DOCUMENTS 4,898,679 A * 2/1990 Siegel ................. C02F 1/78
210/744
2018/0221825 A1 8/2018 Imamura et al.

FOREIGN PATENT DOCUMENTS

JP H0398996 U 10/1991
JP 2001070761 A 3/2001
(Continued)

OTHER PUBLICATIONS

Kadokawa K—JP-2003300071-A machine translation—Oct. 2003 (Year: 2003).*
(Continued)

*Primary Examiner* — Bradley R Spies
(74) *Attorney, Agent, or Firm* — Buchanan Ingersoll & Rooney PC

(57) ABSTRACT

A water treatment membrane washing apparatus includes two ozone dissolving tanks for storing filtrate generated by filtering raw water through a water treatment membrane and gas aspirators provided for the respective ozone dissolving tanks, for mixing the filtrate with ozone gas supplied from an ozone supply unit to generate ozone gas containing filtrate, and is configured such that waste ozone gas generated in one of the ozone dissolving tanks is aspirated by the gas aspirator provided for the other ozone dissolving tank. After the filtrate from the raw water is pretreated by being mixed with the waste ozone gas in the aspirator, the pretreated filtrate is mixed with the ozone gas in the other ozone dissolving tank until it reaches a predetermined concentration. The ozone gas containing filtrate is supplied from the (Continued)

secondary side of the water treatment membrane to the primary side thereof to wash the eater treatment membrane.

6 Claims, 6 Drawing Sheets

(52) U.S. Cl.
CPC .... *B01D 2321/12* (2013.01); *B01D 2321/168* (2013.01); *B01D 2321/18* (2013.01); *B01D 2321/205* (2013.01); *B01D 2321/40* (2013.01); *C02F 2303/16* (2013.01)

(56) References Cited

FOREIGN PATENT DOCUMENTS

| JP | 2003300071 A | * | 10/2003 |
| JP | 2006055773 A | | 3/2006 |
| JP | 2007069091 A | | 3/2007 |
| JP | 2013086011 A | | 5/2013 |
| JP | 2017087213 A | | 5/2017 |

OTHER PUBLICATIONS

Office Action dated Oct. 15, 2021, in corresponding Chinese Patent Application No. 201880052571.6 and English translation of the Office Action (31 pages).
International Search Report (PCT/ISA/210) dated Oct. 2, 2018, by the Japan Patent Office as the International Searching Authority for International Application No. PCT/JP2018/027217.
Written Opinion (PCT/ISA/237) dated Oct. 2, 2018, by the Japan Patent Office as the International Searching Authority for International Application No. PCT/JP2018/027217.
Office Action dated Dec. 15, 2020, issued in Japanese Patent Application No. 2019537995, 15 pages including 8 pages of English translation.
Indian Office Action dated May 19, 2020 issued in corresponding Indian Patent Application No. 202027004015 (6 pages).

* cited by examiner

WATER TREATMENT MEMBRANE WASHING APPARATUS AND WATER TREATMENT MEMBRANE WASHING METHOD

TECHNICAL FIELD

The present application relates to washing apparatus for water treatment membrane and methods of washing water treatment membrane.

BACKGROUND ART

In a water treatment system such as for drinking water, sewage water, or various waste water, membrane separation using water treatment membrane is employed as a method of removing suspended solids and bacteria. While such a water treatment system separates suspended solids and filtrate by filtering water to be treated through a separation membrane, continuous membrane treatment entails adhesion of the suspended solids inside and on the surface of the water treatment membrane and this may sometimes lead to clogging of pores formed in the water treatment membrane. When the pores of the water treatment membrane are clogged, since separation performance is reduced owing to increase of pressure difference across the membrane or reduction of the amount of filtrate, the inside or the surface of the water treatment membrane needs to be washed to remove the suspended solids.

The method of washing water treatment membrane is generally backwashing, in which a washing liquid is supplied from the secondary side (filtrate side) of the water treatment membrane to the primary side (raw water side) thereof to washing the inside of and the surface of the water treatment membrane. While there are various washing liquid, water or oxidizing agent solution such as sodium hypochlorite solution is used for backwashing. Furthermore, in order to obtain a higher washing effect, ozone water (ozone-dissolved water) exhibiting a high oxidizability is used in some cases (see, for example, Patent Document 1).

PRIOR ART DOCUMENT

Patent Document

Patent Document 1: JP2001-70761 A (FIG. 1)

SUMMARY OF THE INVENTION

Problem That the Invention is to Solve

In a traditional washing of water treatment membrane using ozone water, a washing method has been employed in which ozone gas is directly injected into the filtrate filtered through the water treatment membrane and the water treatment membrane is washed after the dissolved ozone concentration reaches a pre-given value. The filtrate filtered through the water treatment membrane, however, contains a trace quantity of substances, such as low molecular organic substances, that react with ozone. For that reason, although the ozone gas is directly injected into the filtrate, the substances react early with the ozone, thus reducing the ratio of the amount of ozone dissolved in the filtrate to the amount of injected ozone gas. This results in increasing the amount of required ozone gas to be injected in generating the ozone water, thus leading to a problem of increasing the running cost for ozone gas generation.

The present application discloses a technology for resolving the above-described problem, and aimed at providing a water treatment membrane washing apparatus that has a high utilization efficiency of ozone gas and further aimed at reducing the capacity of a unit for disposal of exhaust ozone gas and at preventing initial cost from increasing by reusing waste ozone gas generated in generating the ozone water.

Means for Solving the Problem

A water treatment membrane washing apparatus disclosed in the present application uses an ozone water generated by dissolving ozone gas in a filtrate generated by filtering a raw water through a water treatment membrane and includes: an ozone gas supply unit configured to generate an ozone gas; a first ozone dissolving tank and a second ozone dissolving tank configured to store the filtrate; a first aspirator configured to aspirate an ozone gas using as a driving water a filtrate circulated from the first ozone dissolving tank and to mix the filtrate with the ozone gas supplied from the ozone gas supply unit; a second aspirator configured to aspirate an ozone gas using as a driving water a filtrate circulated from the second ozone dissolving tank and to mix the filtrate with a waste ozone gas generated in the first ozone dissolving tank; and a switching valve configured to switch a supply destination from one of the gas aspirators to the other of the gas aspirators, wherein an ozone gas containing filtrate stored in the second ozone dissolving tank or in the first ozone dissolving tank is passed from the secondary side of the water treatment membrane to the primary side of the water treatment membrane to wash the water treatment membrane.

Advantage Effect of the Invention

According to the present application, a water treatment membrane washing apparatus can be provided that has a high utilization efficiency of ozone gas. Moreover, by reusing waste ozone gas to generate ozone water, a unit for disposal of exhaust ozone gas can be reduced in capacity and initial costs can be prevented from increasing.

EMBODIMENTS FOR CARRYING OUT THE INVENTION

Embodiment 1

Figure 1:
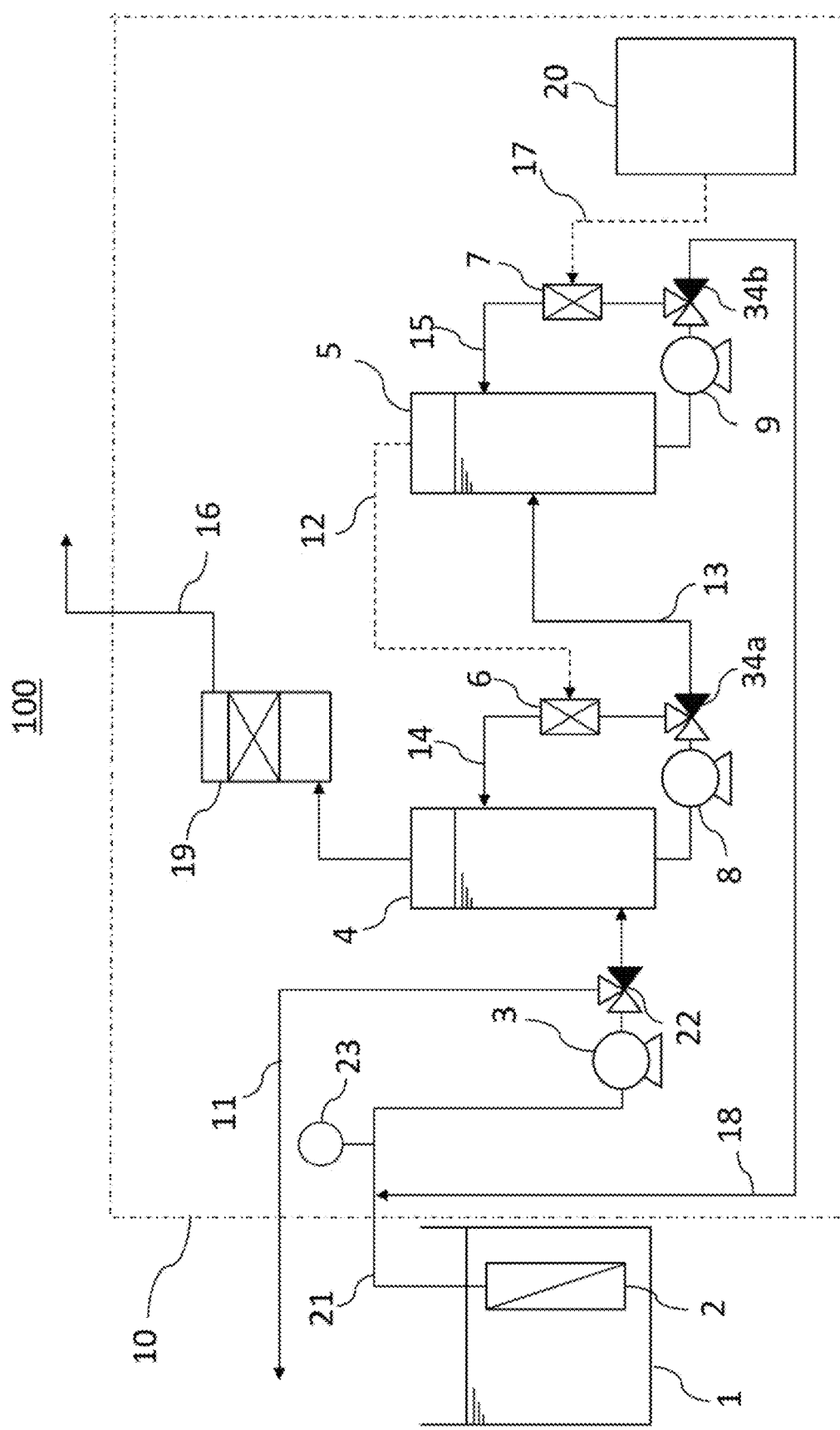
FIG. 1 is a schematic diagram showing a whole configuration of a water treatment system according to Embodiment 1.

Embodiment 1 is described below with reference to FIG. 1. FIG. 1 is a schematic diagram showing the whole configuration of a water treatment system according to Embodiment 1. FIG. 1 shows a state of the water treatment system in a treatment process of a raw water. The water treatment system 100 includes a membrane separation tank 1 having therein a separation membrane 2, which is a water treatment membrane for separating suspended solids from a raw water such as drinking water, sewage water, or various waste water; a washing apparatus 10 for washing the separation membrane 2, i.e., a water treatment membrane washing apparatus 10; and a filtration pump 3 for sucking the raw water to be filtered through a membrane separation tank 1 through the separation membrane 2.

The water treatment membrane washing apparatus 10 includes an ozone gas supply unit 20; an ozone dissolving tank 4 for temporarily storing a filtrate generated by filtering the raw water through the separation membrane; an ozone water generating tank 5 for temporarily storing a pretreated filtrate generated in the ozone dissolving tank 4; and an exhaust ozone gas decomposition column 19 for disposal of an exhaust ozone gas generated in the ozone dissolving tank 4. The ozone dissolving tank 4 and the ozone water generating tank 5 are the same in capacity, and are provided with circulation pumps 8, 9 and circulation pipes 14, 15 for circulating the water in the respective tanks. The circulation pipes 14, 15 are provided with gas aspirators 6, 7 driven by flow momentum of the circulated flows, respectively.

The ozone gas supply unit 20 is made up of a source gas supply (not shown) and an ozonizer (not shown) for generating an ozone gas from oxygen supplied from the source gas supply. The source gas supply uses, for example, a liquid oxygen tank or an oxygen generator utilizing such as vacuum pressure swing adsorption (APSA), but is not particularly limited to those as long as the source gas supply is able to supply oxygen. The ozonizer may use, for example, a discharge ozonizer.

The ozone gas supply unit 20 is connected via an ozone gas pipe 17 to the gas aspirator 7 provided for the ozone water generating tank 5. The gas aspirator 7 is provided to the discharge side of the circulation pump 9 and connected to the circulation pipe 15 to aspirate the ozone gas supplied from the ozone gas supply unit 20 using the circulated flow from the circulation pumps 9, to mix the ozone gas with the circulated water.

The ozone water generating tank 5 is connected from an upper gas phase space therein via a waste ozone gas aspiration pipe 12 to the gas aspirator 6 provided for the ozone dissolving tank 4. Similarly, the gas aspirator 6 is also provided to the discharge side of the circulation pump 8 and connected to the circulation pipe 14 to aspirate a waste ozone gas generated in the ozone water generating tank 5 and accumulated in the gas phase space therein using the circulated flow from the circulation pumps 8, to mix the waste ozone gas with the circulated water.

The circulation pipe 14 connected to the ozone dissolving tank 4 branches to a pretreated filtrate pipe 13 at a three way valve 34a provided to the discharge side of the circulation pump 8 and is connected to the ozone water generating tank 5. The circulation pipe 15 connected to the ozone water generating tank 5 also branches to a filtrate pipe 21 at a three way valve 34b provided to the discharge side of the circulation pump 9 and is connected to a backwash water pipe 18. The filtrate pipe 21 is provided with a differential pressure gauge 23 for measuring the pressure difference across the membrane during the filtration. The circulation pipes 14, 15 each have an ozone concentration meter (not shown) attached upstream to the gas aspirators 6, 7 to measure dissolved ozone concentrations in the tanks, respectively.

The exhaust ozone gas decomposition column 19 is connected with an upper gas phase space in the ozone dissolving tank 4 via a pipe, and the exhaust ozone gas decomposition column 19 is packed with a catalyst, an activated carbon, or the like for reducing the ozone to oxygen. The exhaust ozone gas decomposition column 19 has an atmosphere exhaust pipe 16 connected downstream thereto.

Figure 2:
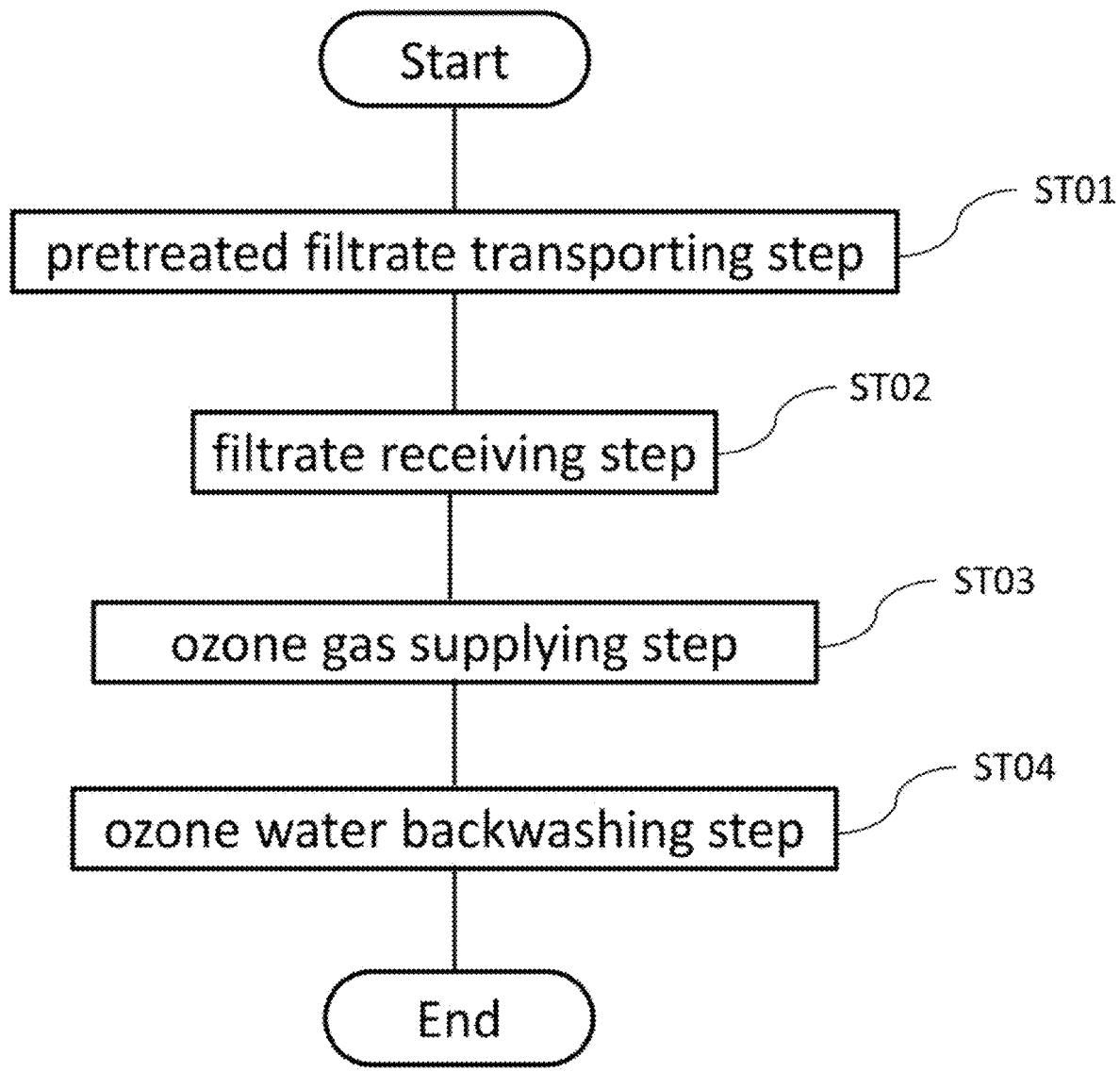
FIG. 2 is a process flowchart showing a water treatment membrane washing method according to Embodiment 1.

Next, an operation of the water treatment washing apparatus is described. FIG. 2 is a process flowchart showing a water treatment membrane washing method according to Embodiment 1. The water treatment membrane washing method according to Embodiment 1 includes four steps: a pretreated filtrate transporting step (Step ST01), a filtrate receiving step (Step ST02), an ozone gas supplying step (Step ST03), and an ozone water backwashing step (Step ST04). Each step is described below.

In Embodiment 1, the waste ozone gas is supplied from the upper gas phase space in the ozone water generating tank 5 into the filtrate in the ozone dissolving tank 4 with the ozone gas being supplied from the ozone gas supply unit 20 into the pretreated filtrate in the ozone water generating tank 5 in the ozone gas supplying step (Step ST03).

Here, assuming a state in which an ozone gas containing filtrate generated in the ozone water generating tank 5 has been supplied to the separation membrane 2 to backwash the membrane and the backwashing is finished, the ozone dissolving tank 4 is filled with the pretreated filtrate dissolving the ozone and the ozone water generating tank 5 is in an evacuated state of the ozone gas containing filtrate.

The pretreated filtrate transporting step (Step ST01) is started from this state. To be more specific, in the pretreated filtrate transportation step (Step ST01), the pretreated filtrate stored in the ozone dissolving tank 4 reduced in organic substance concentration and pH lower than those of the filtrate from the separation membrane by mixing of the filtrate with the waste ozone gas in the later-described ozone gas supply step (Step ST03), is transported to the ozone water generating tank 5 through the pretreated filtrate pipe 13 by the circulation pump 8. The flow path on the discharge side of the circulation pump 8 is switched to the pretreated filtrate pipe 13 using the three way valve 34a. When the entire pretreated filtrate stored in the ozone dissolving tank 4 is transported to the ozone water generating tank 5, the pretreated filtrate transportation step is finished.

Next, the filtrate receiving step (Step ST02) is described. While the filtrate filtered through the separation membrane 2 is usually flowing out by the filtrate pump 3 to the outside of the water treatment system 100 through the filtrate pipe 11, the flow path of the filtrate in filtrate receiving step is switched by three way valve 22, which is a flow path switching value, from the usual path through the filtrate pipe 11 to a path to the ozone dissolving tank 4 for the filtrate to be transported thereto. When the water level in the ozone dissolving tank 4 reaches nearly its full level (about a level more than 80% of the full level; the same applies below), the flow path is switched by the three way valve 22 to transport the filtrate to the outside of the water treatment system 100.

Next, the ozone gas supplying step (Step ST03) is described. The flow paths of the circulation pumps 8, 9 provided for the respective tanks are switched to the circulation pipes 14, 15 by the three way valves 34a, 34b, and then the circulation pumps 8, 9 are started to circulate the stored filtrates in the respective tanks through the gas aspirators 6, 7. Utilizing flow momentum of the circulated flows from the circulation pumps 8, 9, the gas aspirators 6 reduces pressure of the gas phase space in the ozone water generating tank 5 by aspiration and the gas aspirator 7 reduces pressure by aspirating the ozone gas from the ozone gas supply unit 20.

After the flow rates of the circulation pumps 8, 9 stabilizes, the ozone gas is supplied to the gas aspirator 7 from the ozone gas supply unit 20 through the ozone gas pipe 17. The supplied ozone gas is mixed in the gas aspirators 7 with the pretreated filtrate, which serves as driving water, circulated from the ozone water generating tank 5. Part of the ozone gas is dissolved in the pretreated filtrate and the rest thereof remains as an undissolved ozone gas, and the pretreated filtrate is returned in a gas-liquid multiphase flow state to the lower liquid phase portion in the ozone water generating tank 5 through the circulation pipe 15.

The undissolved ozone gas in the liquid phase portion in the ozone water generating tank 5 moves upward in a bubble state, while being in contact with the pretreated filtrate in the tank, to the upper gas phase space in the ozone water generating tank 5.

The undissolved ozone gas moved to the upper space in the ozone water generating tank 5 is reduced in pressure by being aspirated by the gas aspirator 6 and mixed in the gas aspirator 6 with the filtrate circulated from the ozone dissolving tank 4 by the circulation pump 8. Part of the ozone gas is dissolved in the filtrate and reacts with organic substances in the filtrate, to thereby be converted to oxygen.

Part of the organic substances reacted with the ozone are oxidized to organic acids, to reduce pH of the stored filtrate in the tank. It is known that the decomposition rate of dissolved ozone decreases with reducing pH. Accordingly, pH reduction due to generation of the organic acids contributes to reduction of the ozone gas supply time required for obtaining a desired value, in other words, a pre-given value of dissolved ozone concentration and to increase of the dissolved-ozone concentration.

The rest of the ozone gas, on the other hand, remains as an dissolved ozone gas in the filtrate and is returned in a gas-liquid multiphase flow state (the gas is the undissolved ozone gas and the liquid is the filtrate) to the liquid phase portion in the ozone dissolving tank 4 through the circulation pipe 14. The undissolved ozone gas remaining in the liquid phase portion in the ozone dissolving tank 4 moves upward in a bubble state to the upper gas phase space in the ozone dissolving tank 4 while being in contact with the filtrate in the ozone dissolving tank. The gas phase space in the ozone dissolving tank 4 is reduced in pressure such as by a blower (not shown) provided to the atmosphere exhaust pipe 16. The ozone gas moving upward to the gas phase space is sucked and decomposed to oxygen by adsorptive reduction such as by the catalyst or the activated carbon in the exhaust ozone gas decomposition column 19, to be exhausted in the atmosphere through the atmosphere exhaust pipe 16.

When the dissolved ozone concentration in the stored filtrate in the ozone water generating tank 5 reaches the pre-given value, the ozone gas supplying step is finished. Since the effect of washing the separation membrane 2 becomes larger with increasing dissolved ozone concentration, the pre-given value is preferably set close to the saturation solubility as possible. However, since the saturation solubility of ozone varies depending on temperature and pH of solvent, and atmospheric pressure, the pre-given value may be set at a fixed value of, for example, 30 mg/l or more to keep constant the dissolved ozone concentration for each washing. Otherwise, by calculating beforehand an ozone gas supply time that brings the dissolved ozone concentration to the pre-given value, the ozone gas supply time instead of the pre-given value may be set in an actual ozone gas supplying step.

When the dissolved ozone concentration of the stored filtrate in the ozone water generating tank 5 reaches the pre-given value and the pressure measured by the differential pressure gauge increases from that at the start of the filtration to a predetermined pressure, the process proceeds to the ozone water backwashing step (Step ST04). In the backwashing step, the ozone gas supply from the ozone gas supply unit 20 is stopped and the circulation pump 8 provided to the ozone dissolving tank 4 is sopped, and then the flow path from the discharge side of the circulation pump 9 provided to the ozone water generating tank 5 is switched from the circulation pipe 15 to the backwash water pipe 18 by the three way valve 34*b*.

The ozone gas containing filtrate having the pre-given concentration is supplied by the circulation pump 9 as a backwash water from the secondary side (filtrate side) of the water treatment membrane 2 to the primary side (raw water side) thereof, to wash the inside of the membrane, when passing through the membrane, by dissolving impurities such as organic suspended substances clogging inside the membrane by oxidizing power of the dissolved ozone. The ozone gas containing filtrate after used in the washing is passed to the primary side (raw water side).

In the backwashing, the pressure of the ozone gas containing filtrate supplied by the circulation pump 9 is preferably no higher than 300 kPa to avoid the breakage of the separation membrane 2. In addition, the washing of the separation membrane 2 usually takes about 30 minutes although depending on the size of the separation membrane 2 and the degree of clogging. After the backwashing for a predetermined time, the circulation pump 9 is stopped, and the ozone water backwashing step is finished.

As described above, according to Embodiment 1, the pretreated filtrate generated in the ozone dissolving tank 4 by reacting with the waste ozone gas and transported to the ozone water generating tank 5 in the last batch process is used to generate the ozone gas containing filtrate, to be more specific, the two ozone dissolving tanks are provided, and the ozone gas containing filtrate is generated from the pretreated filtrate reacted with the waste ozone gas and transported to a first one of the ozone dissolving tanks in the last batch process, by supplying ozone gas from the ozone gas supply unit, and at the same time, the pretreated filtrate for generating the ozone gas containing filtrate to be used in the next batch process is generated from the filtrate transported to a second one of the ozone dissolving tanks by reacting with the waste ozone gas from the first ozone dissolving tank. This enables the ozone gas containing filtrate to be generated from the pretreated filtrate previously reacted with the waste ozone gas, thus being able to reduce ozone consumption due to reaction with organic substances in the ozone gas containing filtrate and being able to provide a water treatment membrane washing apparatus having a high utilization efficiency of ozone gas. Moreover, the waste ozone gas is reused to generate the pretreated filtrate, thus being able to reduce the capacity of the decomposition column for disposal of the exhaust ozone gas and to prevent initial costs from increasing.

Embodiment 2

While Embodiment 1 described the water treatment system 100 that supplies the ozone gas only to one of the ozone dissolving tanks and aspirates the waste ozone gas only from the other ozone dissolving tank, Embodiment 2 describes in detail below a water treatment system 100 that can switch supply destinations of the ozone gas and the waste ozone gas by providing respective switching valves to the ozone gas pipe 17 and the waste ozone gas aspiration pipe 12 to branch and supply the ozone gas and the waste ozone gas to either tanks.

Figure 3:
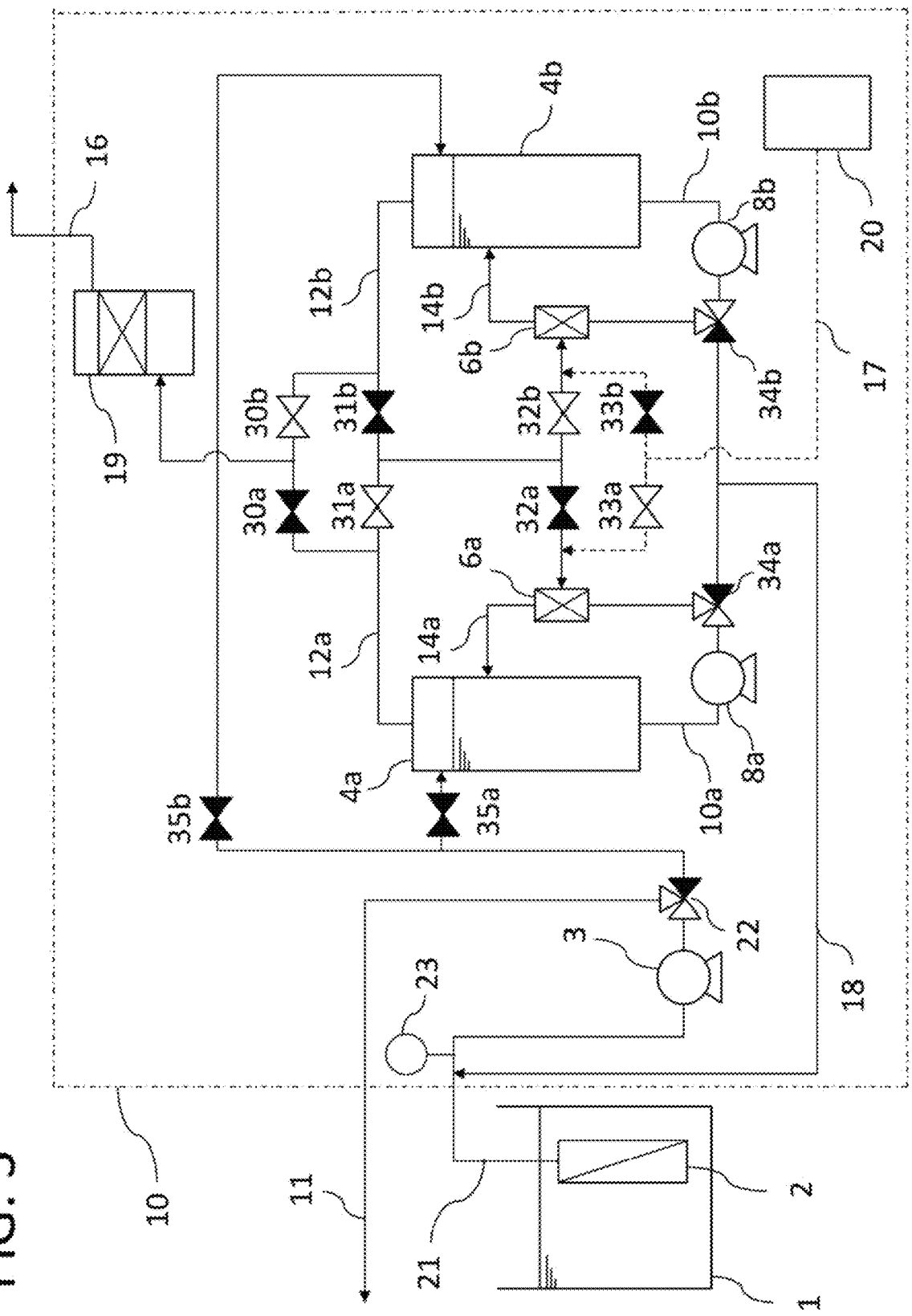
FIG. 3 is a schematic diagram showing a whole configuration of a water treatment system according to Embodiment 2.

FIG. 3 shows a specific example of a water treatment system according to Embodiment 2. In the figure, the switching values indicate by solid marks are in the closed state and the switching values indicate by open marks are in the open state. Among the three flow paths in the three way valves 34a, 34b, each flow path connecting to the backwash water pipe 18, which is to be used in the ozone water backwashing step, is in the closed state here. It should be noted that Embodiment 2 described below is an example, but not limited to that.

FIG. 3 shows the open/closed state of each switching valve in the ozone gas supplying step (Step ST03) shown in FIG. 2. The ozone gas supplied from the ozone gas supply unit 20 is aspirated by a gas aspirator 6a after flowing through the ozone gas pipe 17 and branching through an ozone gas switching valve 33a. The ozone gas is mixed in the gas aspirator 6a with the stored filtrate circulated from an ozone dissolving tank 4a. Part of the ozone gas is dissolved in the stored filtrate and the rest thereof remains as an undissolved ozone gas, and is returned in a gas-liquid multiphase flow state to the liquid phase portion in the ozone dissolving tank 4a through a circulation pipe 14a. The remaining undissolved ozone gas moves upward in a bubble state to the gas phase space therein.

The undissolved waste ozone gas accumulated in the upper gas phase space in the ozone dissolving tank 4a is aspirated by a gas aspirator 6b through a waste ozone gas aspiration pipe 12a via a waste ozone gas switching valve 31a and a waste-ozone-gas inlet switching valve 32b. The stored filtrate circulated from an ozone dissolving tank 4b is mixed with the aspirated waste ozone gas in a gas aspirator 6b and is returned to the liquid phase portion in the ozone dissolving tank 4b through a circulation pipe 14b.

After mixed, the undissolved ozone gas accumulated in the gas phase space in the ozone dissolving tank 4b is sucked by a suction device, such as the blower (not shown), provided to the atmosphere exhaust pipe 16 from the upper gas phase space in the ozone dissolving tank 4b to the exhaust ozone gas decomposition column 19 through a waste ozone gas suction pipe 12b via an inlet valve 30b for the exhaust ozone gas decomposition column.

Figure 4:
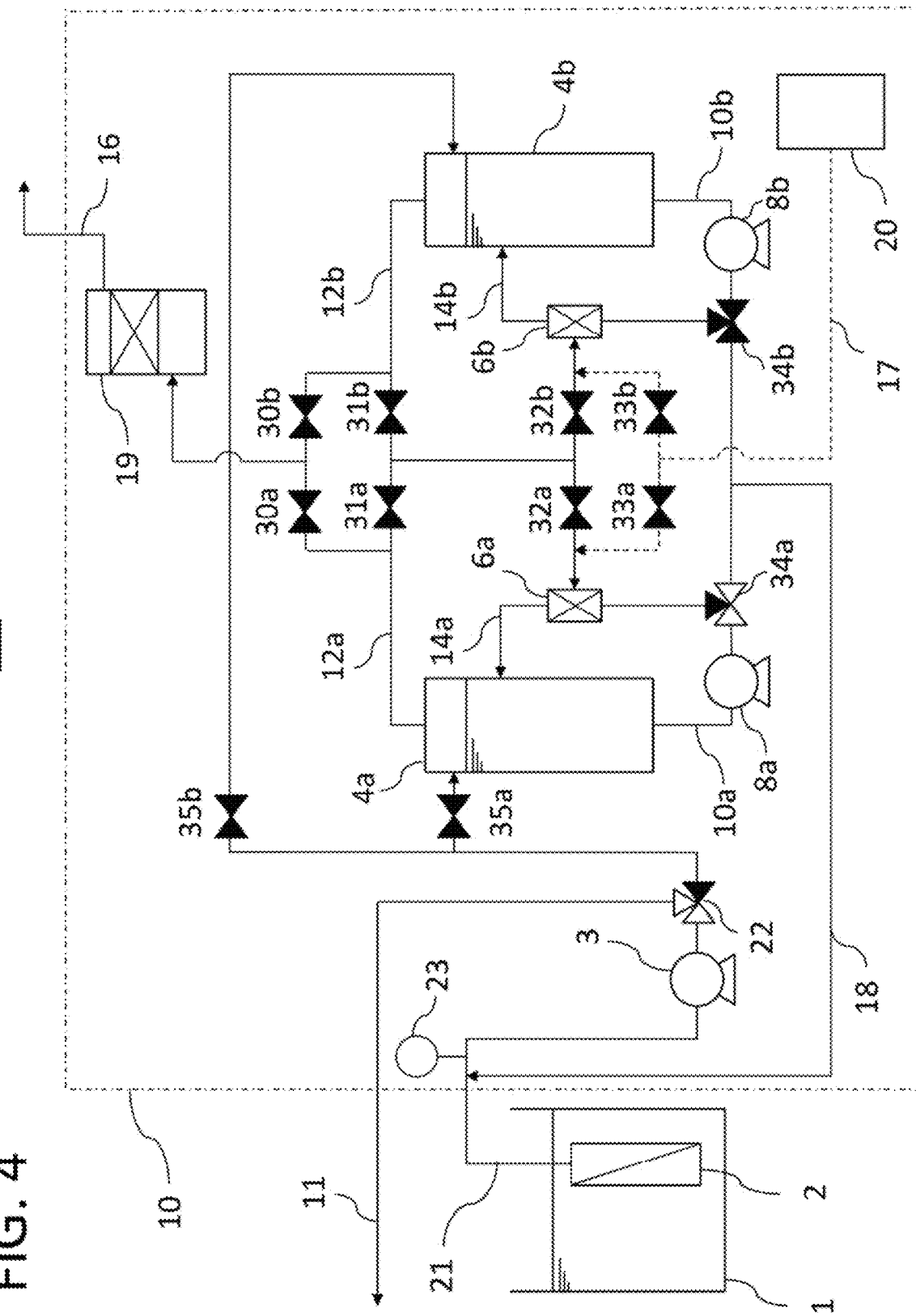
FIG. 4 is a schematic diagram showing a whole configuration in a state during backwashing, of the water treatment system according to Embodiment 2.

When the dissolved ozone concentration of the stored filtrate in the ozone dissolving tank 4a reaches the pre-given value and the pressure measured by the differential pressure gauge 23 increases from that at the start of the filtration to the predetermined pressure, the process proceeds to the ozone water backwashing step (Step ST04). In this step, two of the three flow paths in the three way valve 34a are opened as shown in FIG. 4 to supply the ozone gas containing filtrate in the ozone dissolving tank 4a to the secondary side of the separation membrane 2 by the circulation pump 8a, to wash the membrane. After washing for the predetermined time, the circulation pump 8a is stopped and the ozone water backwashing step (Step ST04) is finished. In addition, the ozone gas switching valve 33a and an ozone gas switching valve 33b are closed during this step.

While Embodiment 1 described that the pretreated filtrate transporting step (Step ST01) is started after the ozone water backwashing step (Step ST04), in embodiment 2, since the ozone dissolving tank 4b is used as the ozone water generating tank 5 of Embodiment 1 and the ozone dissolving tank 4a is used as the ozone dissolving tank 4 of Embodiment 1 in the ozone gas supplying step (Step ST03) in the next batch process, the pretreated filtrate transporting step (Step ST01) can be omitted. In the filtrate receiving step (Step ST02), the three way valve 22 is switched to the washing apparatus 10, and the switching valve 35a is opened and a switching valve 35b is closed to transport the filtrate filtered through the separation membrane 2 to the ozone dissolving tank 4a by the filtration pump 3.

Figure 5:
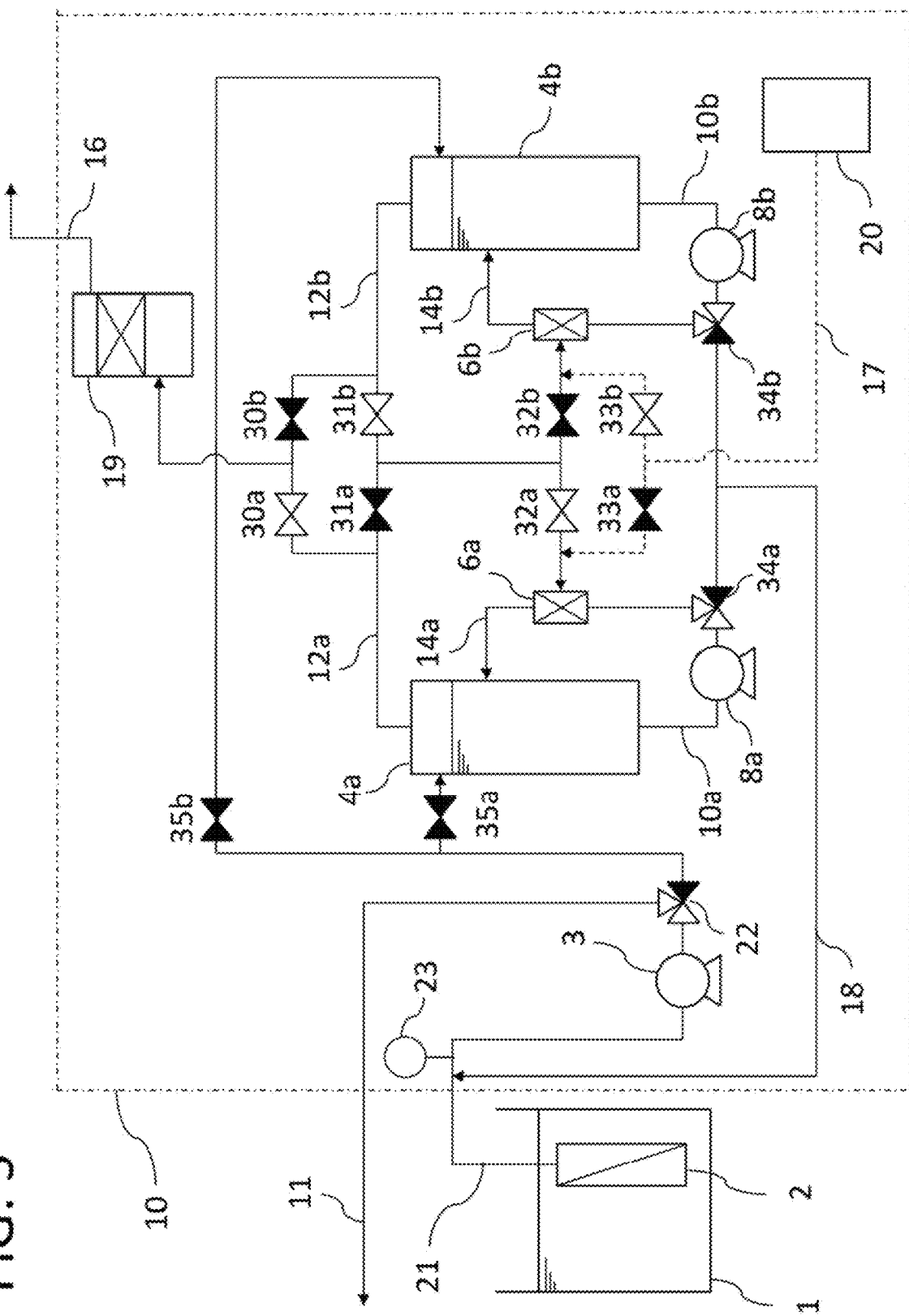
FIG. 5 is a schematic diagram showing a whole configuration in another state, of the water treatment system according to Embodiment 2 in another state.

In the ozone gas supplying step (Step ST03), the ozone gas is supplied to the ozone dissolving tank 4b storing the pretreated filtrate reduced in organic substance concentration and pH by being mixed beforehand with the waste ozone gas in the last batch process by inverting the state of each switching valve shown in FIG. 3 to the state shown in FIG. 5 (in this case, a circulation pump 8b, the waste ozone gas switching valve 31b, and the waste-ozone-gas inlet switching valve 32a are used). This allows for reducing the amount of ozone supply required to obtain the ozone gas containing filtrate having the pre-given ozone concentration. Also during the ozone gas supplying step, the waste ozone gas generated in the ozone dissolving tank 4b is aspirated and mixed with the filtrate as with the last batch by the gas aspirator 6a provided for the ozone dissolving tank 4a.

As described above, according to Embodiment 2, since the supply destinations of the ozone gas and the waste ozone gas can be changed, in other words, the ozone gas containing filtrate can be directly supplied from either tanks to the separation membrane, it is no need to supply the ozone gas every time when the pretreated filtrate mixed with the waste ozone gas is transported to the other tank as in the pretreated filtrate transporting step in Embodiment 1. Thus, according to Embodiment 2, time to complete generation of the ozone gas containing filtrate can be reduced and the running cost can be reduced.

Embodiment 3

While, in Embodiments 1, 2, the water treatment system 100 is configured such that the ozone gas is supplied only to one of the ozone dissolving tanks and the waste ozone gas is aspirated from the other ozone dissolving tank by the gas aspirators 6, 7 utilizing such as an ejector, in Embodiment 3, a water treatment system is configured such that the ozone gas is dissolved using diffuser plates without using the gas aspirators 6, 7. The water treatment system 100 with such a water treatment membrane washing apparatus is described in detail below.

Figure 6:
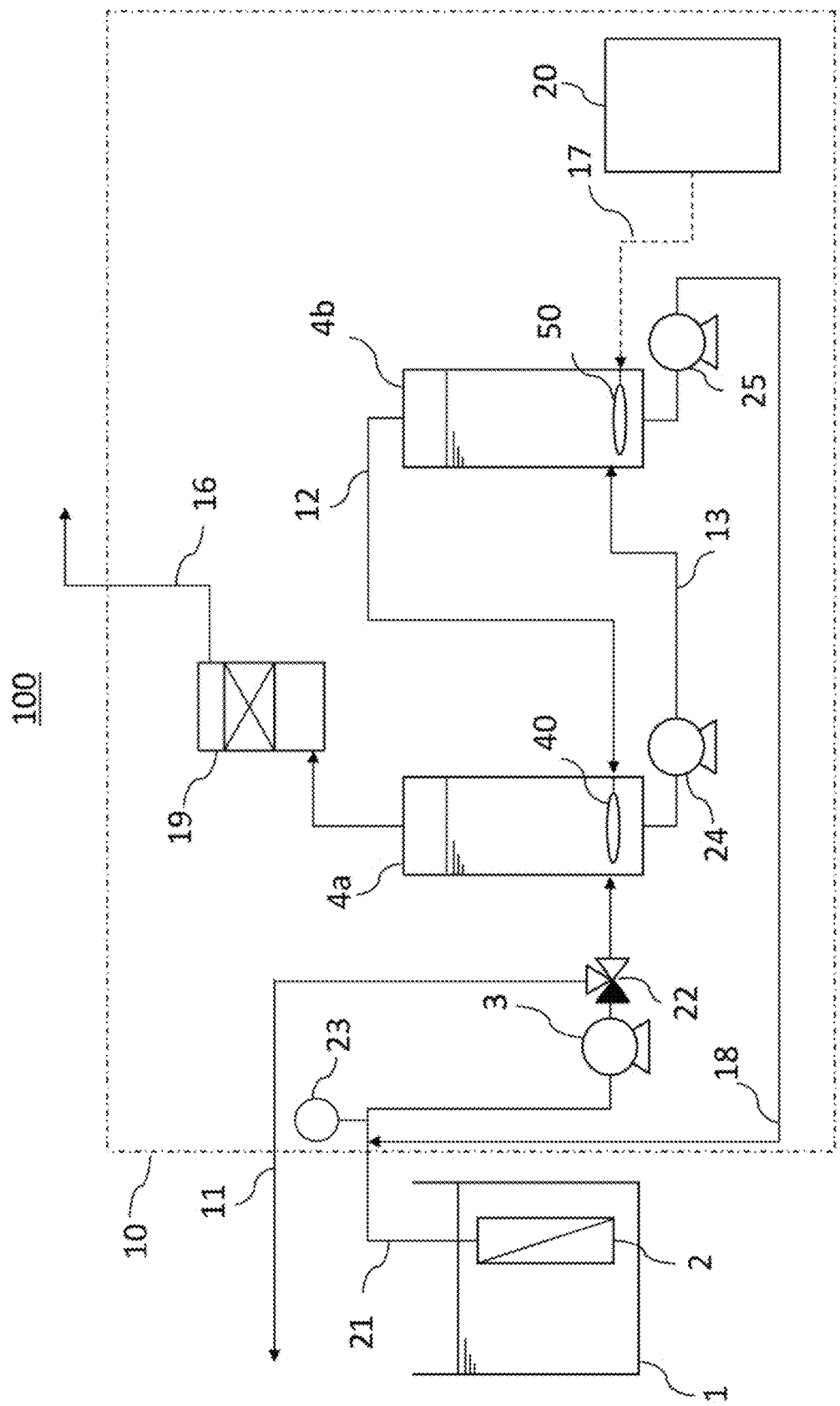
FIG. 6 is a schematic diagram showing a whole configuration of a water treatment system according to Embodiment 3.

FIG. 6 shows a specific example of a water treatment system according to Embodiment 3. In the figure, the switching values indicate by solid marks are in the closed state and the switching values indicate by open marks are in the open state. It should be noted that Embodiment 3 described below is an example, but not limited to that.

FIG. 6 shows the open/closed state of the three way valve 22 in the ozone gas supplying step (Step ST03) described using FIG. 2. The ozone gas from the ozone gas supply unit 20 is supplied to a diffuser plate 50 (also referred to as a first diffuser plate 50; the same applies hereafter) through the ozone gas pipe 17. The ozone gas discharges in a (fine) bubble state from the diffuser plate 50 into the pretreated filtrate in the ozone dissolving tank 4b and is mixed therewith. Part of the ozone gas is dissolved in the pretreated filtrate, and the rest thereof remains in a gas state and is accumulated as the waste ozone gas in the gas phase space in the ozone dissolving tank 4b. The pressure of the accumulated waste ozone gas increases gradually with the amount of ozone gas supplied and exceeds the pressure exerted on a diffuser plate 40 (also referred to as a second diffuser plate 40; the same applies hereafter) by the filtrate stored in the ozone dissolving tank 4a, whereby the accumulated waste ozone gas finally discharges from the diffuser plate 40.

When the dissolved ozone concentration of the stored filtrate in the ozone dissolving tank 4b reaches the pre-given value and the pressure measured by the differential pressure gauge 23 increases from that at the start of the filtration to the predetermined pressure, the process proceeds to the ozone water backwashing step (Step ST04). In this step, the ozone gas containing filtrate in the ozone dissolving tank 4b is supplied to the secondary side of the separation membrane 2 by a backwash pump 25, to backwash the separation membrane. After backwashing for the predetermined time, the backwash pump 25 (a backwash pump 24 too if the water treatment membrane washing apparatus of Embodiment 3 is configured as same as Embodiment 2) is stopped, and the ozone water backwashing step (Step ST04) is finished. The aforementioned circulation pumps are relatively large because they need to generate the driving water for the gas aspirators 6, 7 to aspirate the ozone gas and the waste ozone gas by utilizing such as ejector and operates for a relatively extended period in aspirating the waste ozone gas. In contrast to this, the backwash pumps 24, 25 may be smaller pumps and this is different point from the circulation pumps. Even using the smaller pumps, they are sufficiently capable of washing the water treatment membrane and only need to run for a relatively short period of about 30 minutes in the backwashing.

As described above, according to Embodiment 3, the ozone gas can be dissolved using the diffuser plates. This eliminates the need of the circulation flows for driving the gas aspirators 6, 7 used in the water treatment systems of Embodiments 1, 2, thus being able to omit the circulation pipes 14, 15 and the circulation pump 9. Thus, if there is a restriction in the installation space for the system or the running cost of the washing apparatus is desired to be prevented from increasing due to use of large circulation pumps, Embodiment 3 has an advantage over Embodiments 2, 3.

It should be noted that each embodiment may be combined or appropriately modified or omitted.

REFERENCE NUMERALS

1: membrane separation tank;
2: separation membrane;
3: filtration pump;
4, 4a, 4b: ozone dissolving tank;
5: ozone water generating tank;
6, 6a, 6b: gas aspirator;
7: gas aspirator;
8, 8a, 8b: circulation pump;
9: circulation pump;
10: washing apparatus;
11: filtrate pipe;
12, 12a, 12b: waste ozone gas aspiration pipe;
13: pretreated filtrate pipe;
14, 14a, 14b: circulation pipe;
15: circulation pipe;
16: atmosphere exhaust pipe;
17: ozone gas pipe;
18: backwash water pipe;
19: exhaust ozone gas decomposition column;
20: ozone gas supply unit;
21: filtrate pipe;
22, 34a, 34b: three way valve;
23: differential pressure gauge;
24, 25: backwash pump;
30a, 30b: inlet valve for exhaust-ozone-gas decomposition column;
31a, 31b: waste ozone gas switching valve;
32a, 32b: waste ozone gas inlet switching valve;
33a, 33b: ozone gas switching valve; and
100: water treatment system.

The invention claimed is:

1. A water treatment membrane washing apparatus that uses an ozone water generated by dissolving an ozone gas in a filtrate generated by filtering a raw water through a water treatment membrane, the water treatment membrane washing apparatus comprising:

an ozone gas supply unit configured to generate an ozone gas and supply the ozone gas through an ozone gas pipe;

a first ozone dissolving tank and a second ozone dissolving tank each configured to store the filtrate or a pretreated filtrate;

a filtration pump connected with a filtration pipe connecting from the water treatment membrane to transport the filtrate to the first ozone dissolving tank or to the second ozone dissolving tank, or to transport the filtrate outside the water treatment membrane washing apparatus;

a three way valve connected with a discharge side of the filtration pump to switch a flow path on the discharge side to a flow path to the first ozone dissolving tank or to the second ozone dissolving tank, or to a flow path outside the water treatment membrane washing apparatus;

a first circulation pump connected with the first ozone dissolving tank to circulate a stored filtrate in the first ozone dissolving tank, or to supply an ozone gas containing filtrate generated from the stored filtrate in the first ozone dissolving tank to the water treatment membrane;

a second circulation pump connected with the second ozone dissolving tank to circulate a stored filtrate in the second ozone dissolving tank, or to supply the ozone gas containing filtrate generated from the stored filtrate in the second ozone dissolving tank to the water treatment membrane;

a first three way valve connected with a discharge side of the first circulation pump to switch a flow path on discharge side to a first circulation pipe returning to the first ozone dissolving tank or to a backwash water pipe connecting to the water treatment membrane;

a second three way valve connected with a discharge side of the second circulation pump to switch a flow path on discharge side to a second circulation pipe returning to the second ozone dissolving tank or to the backwash water pipe connecting to the water treatment membrane;

a first switching valve provided to the ozone gas pipe and a waste ozone gas aspiration pipe connected from the first and the second ozone dissolving tanks to switch a supply destination of the ozone gas supplied from the ozone gas supply unit to the first ozone dissolving tank or a supply destination of a waste ozone gas generated in the first ozone dissolving tank to the second ozone dissolving tank;

a second switching valve provided to the ozone gas pipe and the waste ozone gas aspiration pipe connected from the first and the second ozone dissolving tanks to switch a supply destination of the ozone gas supplied from the ozone gas supply unit to the second ozone dissolving tank or a supply destination of the waste ozone gas generated in the second ozone dissolving tank to the first ozone dissolving tank;

a first aspirator provided to the first circulation pipe to mix the stored filtrate circulated from the first ozone dissolved tank using the stored filtrate as a driving water with the ozone gas aspirated from the ozone supply unit through the first switching valve to generate the ozone gas containing filtrate, or with the waste ozone gas aspirated from the second ozone dissolving tank through the first switching valve to generate the pretreated filtrate;

a second aspirator provided to the second circulation pipe to mix the stored filtrate circulated from the second ozone dissolved tank using the stored filtrate as a driving water with the waste ozone gas aspirated from the first ozone dissolving tank through the second switching valve to generate the pretreated filtrate, or with the ozone gas aspirated from the ozone supply unit through the second switching valve to generate an ozone gas containing filtrate;

a differential pressure gauge provided to the filtrate pipe to measure a pressure difference across the water treatment membrane during a filtration; and an ozone concentration meter attached to each circulation pipe to measure a dissolved ozone concentration in the ozone gas containing filtrate, wherein when a dissolved ozone concentration measured by the ozone concentration meter, of the stored filtrate in the first or the second ozone dissolving tank, reaches a pre-given value and a pressure measured by the differential pressure gauge increases from a pressure at a start of the filtration to a predetermined pressure, the ozone gas containing filtrate generated in the first or the second ozone dissolving tank is passed respectively by the first or the second circulation pump from a secondary side of the water treatment membrane to a primary side of the water treatment membrane to wash the water treatment membrane.

2. A water treatment membrane washing apparatus that uses an ozone water generated by dissolving ozone gas in a filtrate generated by filtering a raw water through a water treatment membrane, the water treatment membrane washing apparatus comprising:

an ozone gas supply unit configured to generate and supply an ozone gas through an ozone gas pipe;

a first ozone dissolving tank configured to store a pretreated filtrate;

a second ozone dissolving tank configured to store the filtrate;

a filtration pump connected with a filtration pipe connecting from the water treatment membrane to transport the filtrate to the second ozone dissolving tank, or to transport the filtrate outside the water treatment membrane washing apparatus;

a three way valve connected with a discharge side of the filtration pump to switch a flow path on the discharge side to a flow path to the second ozone dissolving tank or to a flow path outside the water treatment membrane washing apparatus;

a first circulation pump connected with the first ozone dissolving tank to circulate a stored filtrate in the first ozone dissolving tank, or to supply an ozone gas containing filtrate generated in the first ozone dissolving tank to the water treatment membrane;

a second circulation pump connected with the second ozone dissolving tank to circulate a stored filtrate in the second ozone dissolving tank, or to transport the pretreated filtrate generated in the second ozone dissolving tank to the first ozone dissolving tank;

a first three way valve connected with a discharge side of the first circulation pump to switch a flow path on the discharge side to a first circulation pipe returning to the first ozone dissolving tank or to a backwash water pipe connecting to the water treatment membrane;

a second three way valve connected with a discharge side of the second circulation pump to switch a flow path on the discharge side to a second circulation pipe returning the second ozone dissolving tank or to a pretreated filtrate pipe connecting to the first ozone dissolving tank;

a first aspirator provided to the first circulation pipe to mix the stored filtrate circulated from the first ozone dissolving tank using the stored filtrate as a driving water with the ozone gas aspirated from the ozone supply unit through the ozone gas pipe to generate the ozone gas containing filtrate a second aspirator provided to the second circulation pipe to mix the stored filtrate circulated from the second ozone dissolving tank using the stored filtrate as a driving water with a waste ozone gas aspirated from the first ozone dissolving tank through a waste ozone gas aspiration pipe connected from the first ozone dissolving tank to generate the pretreated filtrate;

a differential pressure gauge provided to the filtration pipe to measure a pressure difference across the water treatment membrane during a filtration; and an ozone concentration meter attached to the first circulation pipe to measure a dissolved ozone concentration of the stored filtrate circulated, wherein when a dissolved ozone concentration measured by the ozone concentration meter, of the stored filtrate in the first ozone dissolving tank, reaches a pre-given value and a pressure measured by the differential pressure gauge increases from a pressure at a start of the filtration to a predetermined pressure, the ozone gas containing filtrate generated in the first ozone dissolving tank is passed by the first circulation pump from a secondary side of the water treatment membrane to a primary side of the water treatment membrane to wash the water treatment membrane.

3. A water treatment membrane washing apparatus that uses an ozone water generated by dissolving ozone gas in a filtrate generated by filtering a raw water through a water treatment membrane, the water treatment membrane washing apparatus comprising:

an ozone gas supply unit configured to generate and supply an ozone gas through an ozone gas pipe;

a first ozone dissolving tank configured to store a pretreated filtrate;

a second ozone dissolving tank configured to store the filtrate;

a filtration pump connected with a filtration pipe connecting from the water treatment membrane to transport the filtrate to the second ozone dissolving tank, or to transport the filtrate outside the water treatment membrane washing apparatus;

a three way valve connected with a discharge side of the filtration pump to switch a flow path of the discharge side to a flow path to the ozone dissolving tank or to a flow path outside the water treatment membrane washing apparatus;

a first backwash pump connected with the second ozone dissolving tank to transport the pretreated filtrate generated in the second ozone dissolving tank to the first dissolving tank;

a first diffuser plate provided in the first ozone dissolving tank to discharge in a bubble state the ozone gas supplied from the ozone gas supply unit into a stored filtrate in the first ozone dissolving tank, to dissolve the ozone gas in a stored filtrate in the first ozone dissolving tank to generate the ozone gas containing filtrate;

a second diffuser plate provided in the second ozone dissolving tank to discharge in a bubble state a waste ozone gas from the first ozone dissolving tank into a stored filtrate in the second dissolving tank, to dissolve the waste ozone gas in a stored filtrate in the second dissolving tank to generate the pretreated filtrate;

a differential pressure gauge provided to the filtration pipe to measure a pressure difference across the water treatment membrane during a filtration;

an ozone concentration meter attached to the first ozone dissolving tank to measure a dissolved ozone concentration of the stored filtrate in the first dissolving tank; and a second backwash pump connected with the first ozone dissolving tank to transport the ozone gas containing filtrate generated in the first ozone dissolving tank to the water treatment membrane, wherein when a dissolved ozone concentration measured by the ozone concentration meter, of the stored filtrate in the first ozone dissolving tank, reaches a pre-given value and a pressure measured by the differential pressure gauge increases from a pressure at a start of the filtration to a predetermined pressure, the ozone gas containing filtrate in the first ozone dissolving tank is passed by the second backwash pump from the secondary side of the water treatment membrane to the primary side of the water treatment membrane to wash the water treatment membrane.

4. A water treatment membrane washing method that uses an ozone water generated by dissolving an ozone gas in a filtrate generated by filtering a raw water through a water treatment membrane and uses the water treatment membrane washing apparatus as set forth in claim 1, the water treatment membrane washing method comprising:

a filtrate receiving step of receiving a filtrate filtered from the raw water to store the filtrate in a first or a second ozone dissolving tank by a filtration pump;

an ozone gas supplying step of supplying an ozone gas from an ozone supply unit to a first or a second aspirator to mix a stored filtrate circulated from the first or the second ozone dissolving tank with the ozone gas to generate a ozone gas containing filtrate, and of supplying, at the same time, a waste ozone gas generated in the second or the first ozone dissolving tank to the first or the second aspirator to mix the stored filtrate circulated from the first or the second ozone dissolving tank to generate a pretreated filtrate; and an ozone water backwashing step of washing the water treatment membrane by passing, by a first or a second circulation pump, the ozone gas containing filtrate generated in the first or the second ozone dissolving tank from a secondary side of the water treatment membrane to a primary side of the water treatment membrane when a dissolved ozone concentration measured by an ozone concentration meter, of the stored filtrate in the first or the second ozone dissolving tank, reaches a pre-given value and a pressure measured by a differential pressure gauge increases from a pressure at a start of the filtration to a predetermined pressure.

5. A water treatment membrane washing method that uses an ozone water generated by dissolving an ozone gas in a filtrate generated by filtering a raw water through a water treatment membrane and uses the water treatment membrane washing apparatus as set forth in claim 2, the water treatment membrane washing method comprising:

a pretreated filtrate transporting step of transporting a pretreated filtrate generated in a second ozone dissolving tank to a first ozone dissolving tank by a second circulation pump;

a filtrate receiving step of receiving a filtrate filtered from the raw water to store the filtrate in the second ozone dissolving tank by a filtration pump;

an ozone gas supplying step of supplying an ozone gas from an ozone supply unit to a first aspirator to mix a stored filtrate circulated from the first ozone dissolving tank with the ozone gas to generate the ozone gas containing filtrate, and of supplying, at the same time, a waste ozone gas generated in the first ozone dissolving tank to the second aspirator to mix the stored filtrate circulated from the second ozone dissolving tank to generate the pretreated filtrate; and an ozone water backwashing step of washing the water treatment membrane by passing, by a first circulation pump, the ozone gas containing filtrate generated in the first ozone dissolving tank from a secondary side of the water treatment membrane to a primary side of the water treatment membrane when a dissolved ozone concentration measured by an ozone concentration meter, of the stored filtrate in the first ozone dissolving tank reaches a pre-given value and a pressure measured by a differential pressure gauge increases from a pressure at a start of the filtration to a predetermined pressure.

6. A water treatment membrane washing method that uses an ozone water generated by dissolving an ozone gas in a filtrate generated by filtering a raw water through a water treatment membrane and uses the water treatment membrane washing apparatus as set forth in claim 3, the water treatment membrane washing method comprising:

a pretreated filtrate transporting step of transporting a pretreated filtrate generated in a second ozone dissolving tank to a first ozone dissolving tank by a transport pump;

a filtrate receiving step of receiving a filtrate filtered from the raw water to store the filtrate in the second dissolving tank by a filtration pump;

an ozone gas supplying step of supplying an ozone gas from an ozone supply unit to a first diffuser plate to mix a stored filtrate in the first ozone dissolving tank with the ozone gas to generate the ozone gas containing filtrate, and of supplying, at the same time, a waste ozone gas generated in the first ozone dissolving tank to a second diffuser plate to mix the stored filtrate in the second ozone dissolving tank to generate the pretreated filtrate; and an ozone water backwashing step of washing the water treatment membrane by passing, by a backwash pump, the ozone gas containing filtrate generated in the first ozone dissolving tank from a secondary side of the water treatment membrane to a primary side of the water treatment membrane when a dissolved ozone concentration measured by the ozone concentration meter, of the stored filtrate in the first ozone dissolving tank reaches a pre-given value and a pressure measured by a differential pressure gauge increases from a pressure at a start of the filtration to a predetermined pressure.

* * * * *